(12) United States Patent
Matsuda et al.

(10) Patent No.: US 9,017,868 B2
(45) Date of Patent: Apr. 28, 2015

(54) BATTERY, VEHICLE, ELECTRONIC DEVICE AND BATTERY MANUFACTURING METHOD

(75) Inventors: Takeshi Matsuda, Kyoto (JP); Masakazu Sanada, Kyoto (JP); Kenta Hiramatsu, Kyoto (JP); Kiyoshi Kanamura, Tokyo (JP)

(73) Assignee: SCREEN Holdings Co., Ltd. (JP)

( * ) Notice: Subject to any disclaimer, the term of this patent is extended or adjusted under 35 U.S.C. 154(b) by 244 days.

(21) Appl. No.: 13/151,844

(22) Filed: Jun. 2, 2011

(65) Prior Publication Data
US 2011/0300440 A1    Dec. 8, 2011

(30) Foreign Application Priority Data

Jun. 8, 2010  (JP) ................. 2010-130834

(51) Int. Cl.
| | |
|---|---|
| *H01M 4/02* | (2006.01) |
| *H01M 4/13* | (2010.01) |
| *H01M 10/50* | (2006.01) |
| *H01S 4/00* | (2006.01) |
| *H01M 4/82* | (2006.01) |
| *H01M 4/88* | (2006.01) |
| *H01M 4/04* | (2006.01) |

(52) U.S. Cl.
CPC .......... *H01M 4/8864* (2013.01); *H01M 4/0404* (2013.01); *H01M 4/0411* (2013.01); *H01M 4/8828* (2013.01); *Y02E 60/50* (2013.01); *Y02E 60/122* (2013.01)

(58) Field of Classification Search
CPC .......... H01M 4/8864; H01M 4/8828; H01M 4/0404; H01M 4/0411; Y02E 60/122; Y02E 60/50

USPC ............ 429/120, 209; 29/592.1, 623.1, 623.5
See application file for complete search history.

(56) References Cited

U.S. PATENT DOCUMENTS

| | | | |
|---|---|---|---|
| 2003/0087158 A1* | 5/2003 | Nakagawa et al. ........... | 429/255 |
| 2003/0217210 A1* | 11/2003 | Carau, Sr. .................... | 710/302 |
| 2005/0031961 A1 | 2/2005 | Tsunekawa et al. | |
| 2007/0226990 A1 | 10/2007 | Morimoto .................... | 29/623.1 |

(Continued)

FOREIGN PATENT DOCUMENTS

| | | |
|---|---|---|
| EP | 0 967 672 | 12/1999 |
| EP | 1 696 499 | 8/2006 |

(Continued)

OTHER PUBLICATIONS

Webster's (Webster's New World dictionary of the American Language 2nd College ed., Guralnik ed., New York 1972) p. 1378 col. 2: Spray.*

(Continued)

*Primary Examiner* — Patrick Ryan
*Assistant Examiner* — Aaron Greso
(74) *Attorney, Agent, or Firm* — Ostrolenk Faber LLP

(57) ABSTRACT

A negative-electrode active material layer formed between a negative-electrode current collector and a solid electrolyte layer has a line-and-space structure in which a plurality of stripe-shaped pattern elements extending in a Y direction are arranged while being separated from each other. A gradient at each contact point where the stripe-shaped pattern element, the negative-electrode current collector and the solid electrolyte layer are in contact with each other is made smaller than 90°.

18 Claims, 10 Drawing Sheets

(56) References Cited

U.S. PATENT DOCUMENTS

| | | | |
|---|---|---|---|
| 2008/0102359 A1* | 5/2008 | Kogetsu et al. | 429/129 |
| 2008/0102370 A1* | 5/2008 | Kashiwagi | 429/218.1 |
| 2008/0199780 A1* | 8/2008 | Hayata et al. | 429/231.95 |
| 2009/0098460 A1 | 4/2009 | Kang et al. | |
| 2010/0099026 A1 | 4/2010 | Choi et al. | 429/212 |
| 2010/0291444 A1* | 11/2010 | Farmer et al. | 429/322 |

FOREIGN PATENT DOCUMENTS

| | | | | |
|---|---|---|---|---|
| JP | 2002-279974 | | 9/2002 | |
| JP | 2003-303586 | | 10/2003 | |
| JP | 2004-134198 | | 4/2004 | |
| JP | 2005-116248 | | 4/2005 | |
| JP | 2007-273249 | | 10/2007 | |
| JP | 2008-117574 | | 5/2008 | |
| JP | 2008-135376 | | 6/2008 | |
| JP | 2008-293793 | * | 12/2008 | H01M 10/36 |
| JP | 2009-045511 | * | 5/2009 | B05B 7/06 |
| JP | 2010-97946 | | 4/2010 | |
| JP | 2010-102985 | | 5/2010 | |

OTHER PUBLICATIONS

Websters New World Dictionary 2nd Col Ed 1972 p. 1411 and also p. 1378.*

Extended European Search Report issued Oct. 27, 2011 in connection with corresponding European Application No. 11168384.3.

Korean Patent Application No. 2011-0045144 Office Action issued Dec. 28, 2012.

Japanese Office Action dated Dec. 17, 2013 corresponding to Japanese Patent Application No. 2010-130834 (3 pages).

* cited by examiner

F I G. 5 A    PRESENT EMBODIMENT
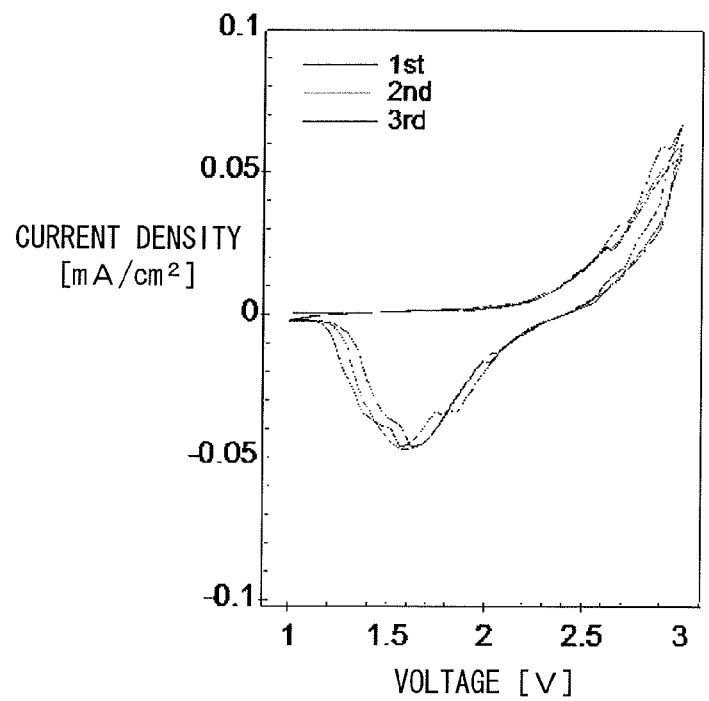
F I G. 5 B    COMPARATIVE EXAMPLE
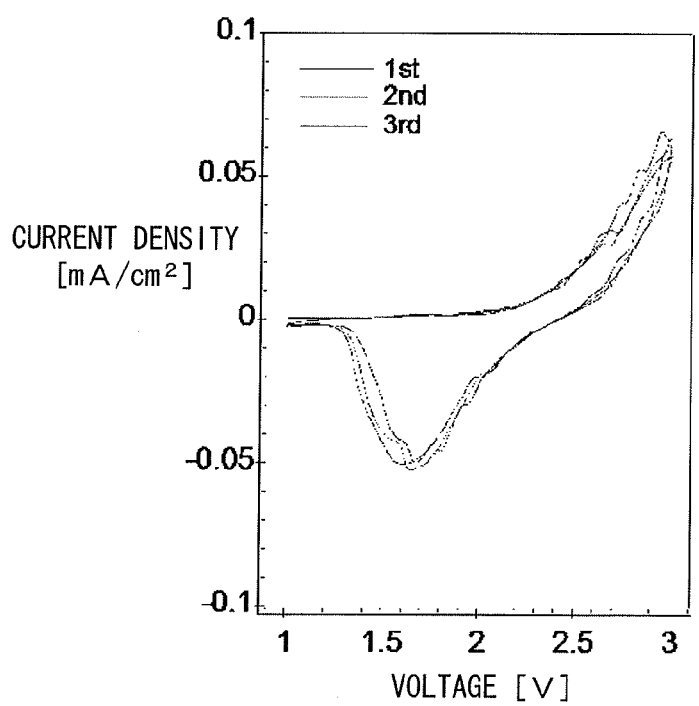

FIG. 6A   PRESENT EMBODIMENT
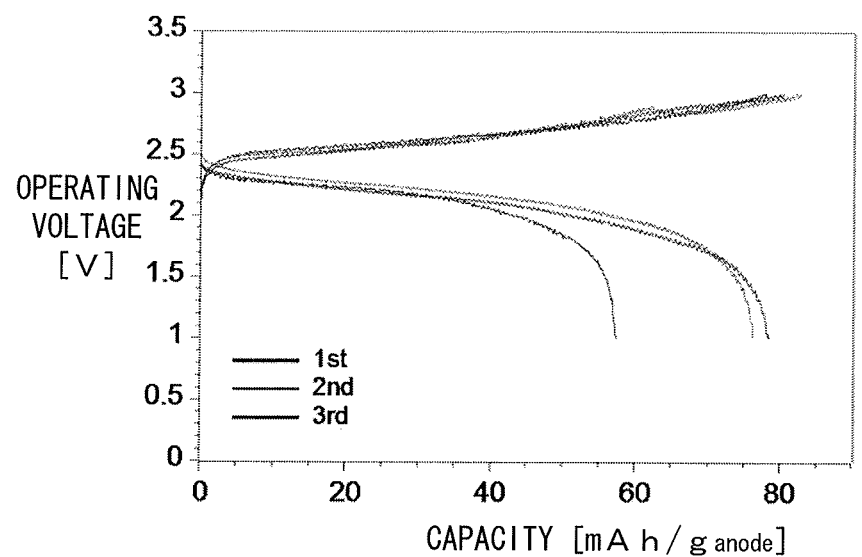
FIG. 6B   COMPARATIVE EXAMPLE
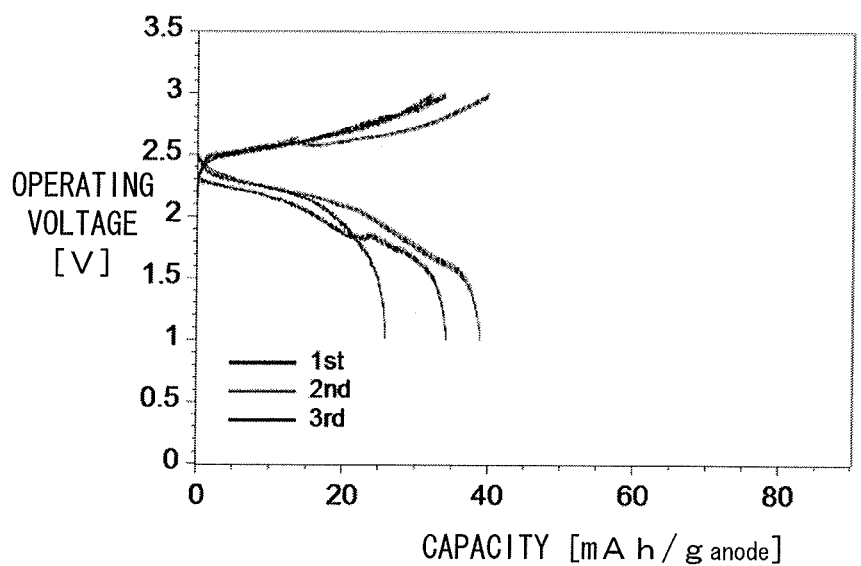

FIG. 7A   PRESENT EMBODIMENT
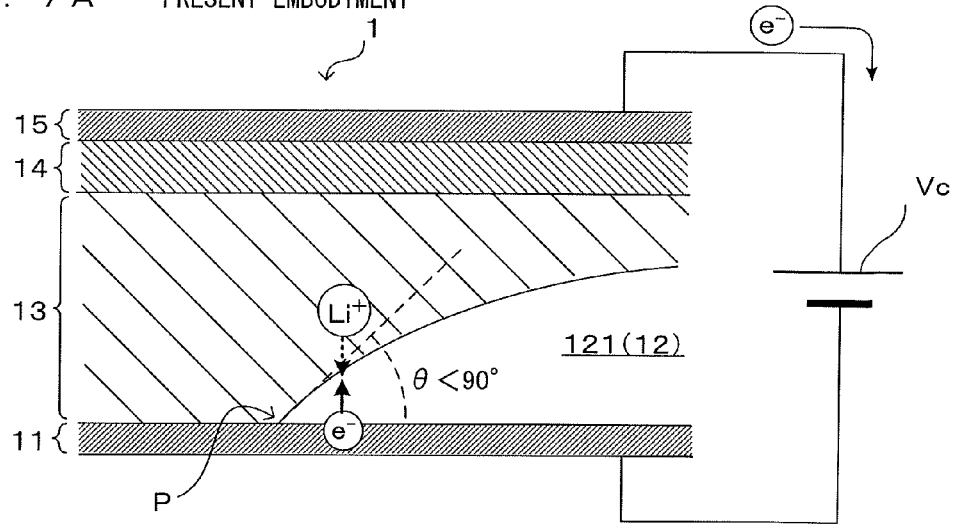
FIG. 7B   COMPARATIVE EXAMPLE 1
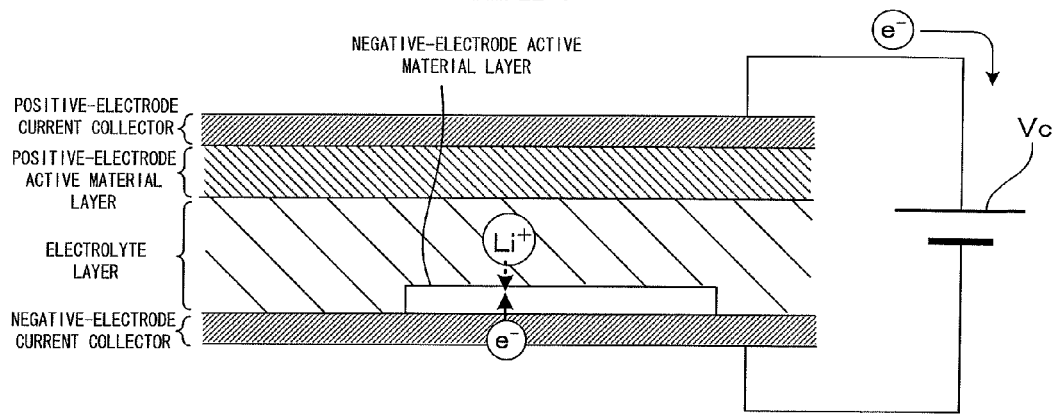
FIG. 7C   COMPARATIVE EXAMPLE 2
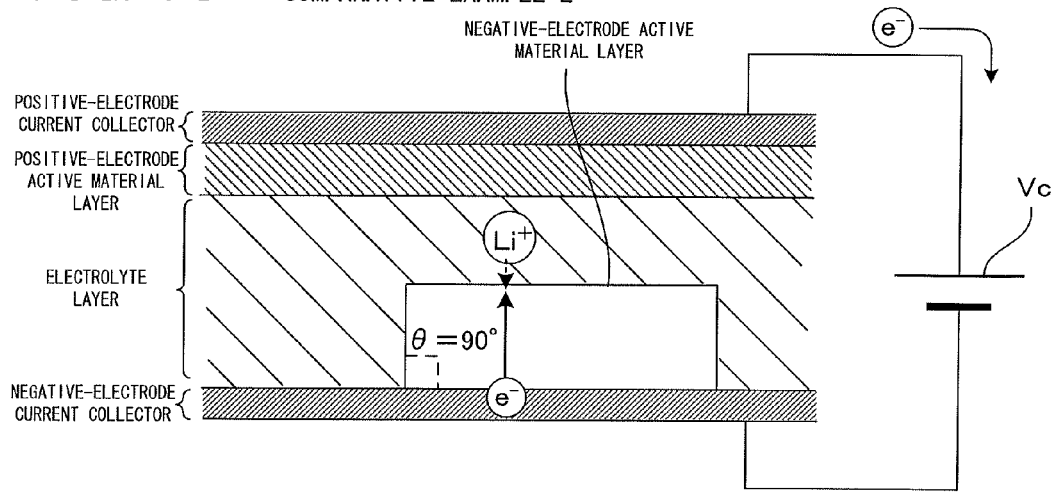

F I G. 9
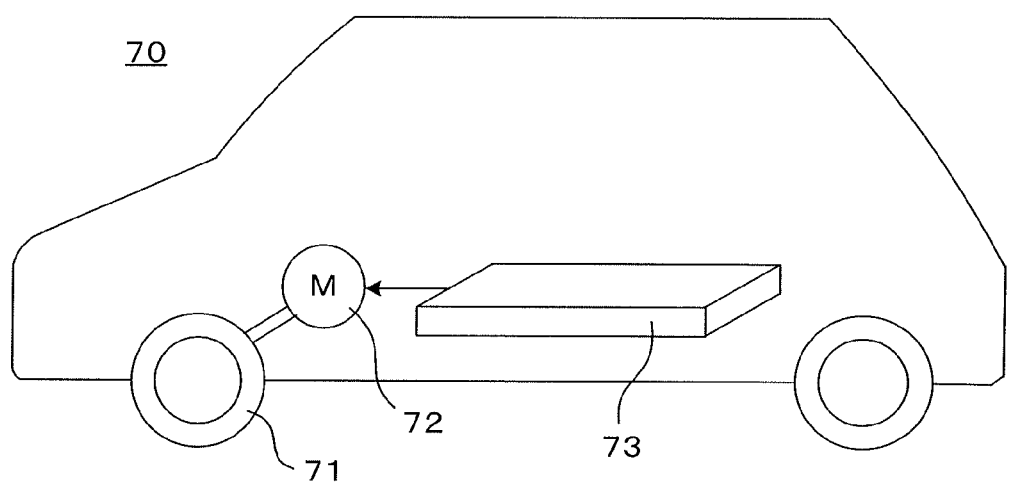

BATTERY, VEHICLE, ELECTRONIC DEVICE AND BATTERY MANUFACTURING METHOD

CROSS REFERENCE TO RELATED APPLICATION

The disclosure of Japanese patent application No. 2010-130834 filed on Jun. 8, 2010 including specification, drawings and claims is incorporated herein by reference in its entirety.

BACKGROUND OF THE INVENTION

1. Field of the Invention

This invention relates to a battery in which an electrolyte layer is interposed between positive-electrode and negative-electrode active materials, a vehicle and an electronic device including this battery, and a method for manufacturing this battery.

2. Description of the Related Art

A battery in which metal foils as current collectors respectively having a positive-electrode active material or a negative-electrode active material deposited thereon are laminated via a separator and the separator is impregnated with an electrolytic solution is known as a battery, a lithium ion secondary battery for instance, having such a structure that an electrolyte layer is laminated between positive-electrode and negative-electrode active materials. In the technical filed of batteries of this type, further miniaturization and higher output are required and various technologies have been and are being proposed to meet such a requirement.

For example, JP2005-116248A discloses a technology for forming and laminating respective functional layers on a metal foil, which will become a current collector, by an ink-jet method in such a manner that contact surfaces of a positive-electrode active material layer and an electrolyte layer and contact surfaces of the electrolyte layer and a negative-electrode active material layer have a three-dimensional uneven structure. Further, JP2002-279974A discloses a structure in which column-shaped active material thin films are deposited as secondary battery electrodes on a current collector surface by vacuum deposition or sputtering via a mesh arranged above the current collector.

However, above-mentioned literatures disclose a possibility of manufacturing a battery having a three-dimensional structure, but a process for manufacturing a battery having a desired structure is complicated. Further, properties (electrochemical properties) of the manufactured battery are not disclosed in detail. As just described, a specific structure of a battery which has good electrochemical properties and can be manufactured with excellent productivity and a method for manufacturing such a battery have not been put to practical use thus far.

SUMMARY OF THE INVENTION

In view of the above problems, an object of this invention is to provide a battery having a small size and good electrochemical properties and a technology for manufacturing such a battery with excellent productivity.

To achieve the above object, a battery of the present invention comprises: a first current collector layer, a first active material layer, an electrolyte layer, a second active material layer and a second current collector layer laminated in this order, wherein, the first active material layer has an island structure in which a plurality of island parts containing an active material are arranged on a surface of the first current collector layer while being separated from each other; and an angle at a side including the first active material layer out of angles formed between the surface of the first current collector layer and a tangent drawn to the first active material layer at a contact point of each island part and the first current collector layer is smaller than 90°.

In this invention, the structure of the first active material layer is not limited to such a structure that the plurality of island parts are completely separated from each other on the surface of the first current collector layer, but may be such that the plurality of island parts are partly connected by connecting parts.

Although described in detail later, a battery having the structure as described above can be manufactured with a relatively small number of manufacturing steps and has good electrochemical properties despite its small and thin size according to a new knowledge obtained by the inventors of this application. Specifically, the battery according to this invention has a high capacity and good charge and discharge characteristics. This invention is effective not only for batteries including an electrolyte layer containing an electrolytic solution, but also for batteries including a solid electrolyte layer containing, for example, a polymer electrolyte.

There are various fields of application for the battery having the above structure. For example, the battery can be applied as a power supply for various vehicles such as electric vehicles and can be applied to various electronic devices including a circuit unit which operates using this battery as a power supply.

To achieve the above object, a battery manufacturing method of the invention comprises: a first step of forming a first active material layer, which has an island structure composed of a plurality of island parts separated from each other, on a surface of a base material which will become a first current collector layer; and a second step of laminating an electrolyte layer covering exposed surfaces of the base material not covered by the first active material layer and a surface of the first active material layer, a second active material layer and a second current collector layer; wherein, in the first step, an angle at a side including the first active material layer out of angles formed between the surface of the first current collector layer and a tangent drawn to the first active material layer at a contact point of each island part and the first current collector layer is smaller than 90°.

In the invention thus constructed, a battery having the structure described above and good properties can be manufactured with excellent productivity by appropriately controlling a cross-sectional shape of the island parts constituting the first active material layer. Further, the battery manufactured by this manufacturing method has a small and thin size and good electrical properties.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIGS. 5A, 5B, 6A and 6B are graphs which show actual measurement data on properties of the battery of this embodiment;

FIGS. 7A, 7B and 7C are drawings which diagrammatically show a difference between the structure of the battery according to the invention and that of a conventional battery module;

FIG. 9 is a drawing which diagrammatically shows a vehicle, specifically an electric vehicle as an example of the device mounted with the battery according to the invention.

DETAILED DESCRIPTION OF THE PREFERRED EMBODIMENTS

Figure 1A:
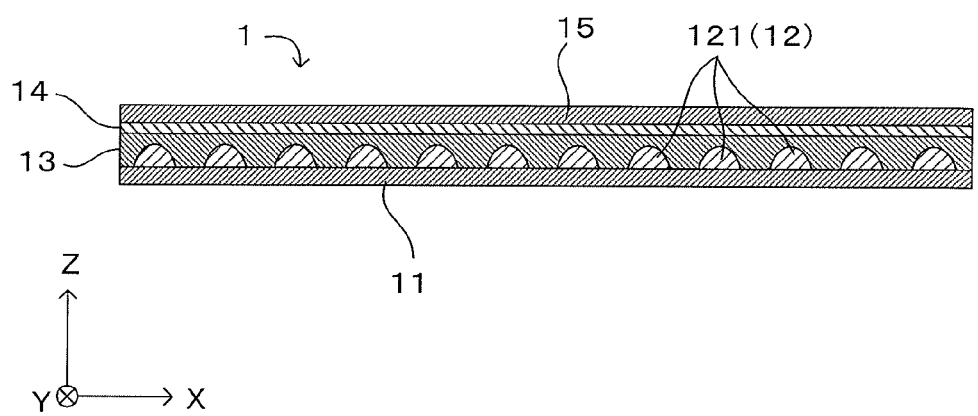
FIG. 1A is a drawing which shows a cross-sectional structure of a lithium-ion secondary battery as one embodiment of a battery according to the invention.
Figure 1B:
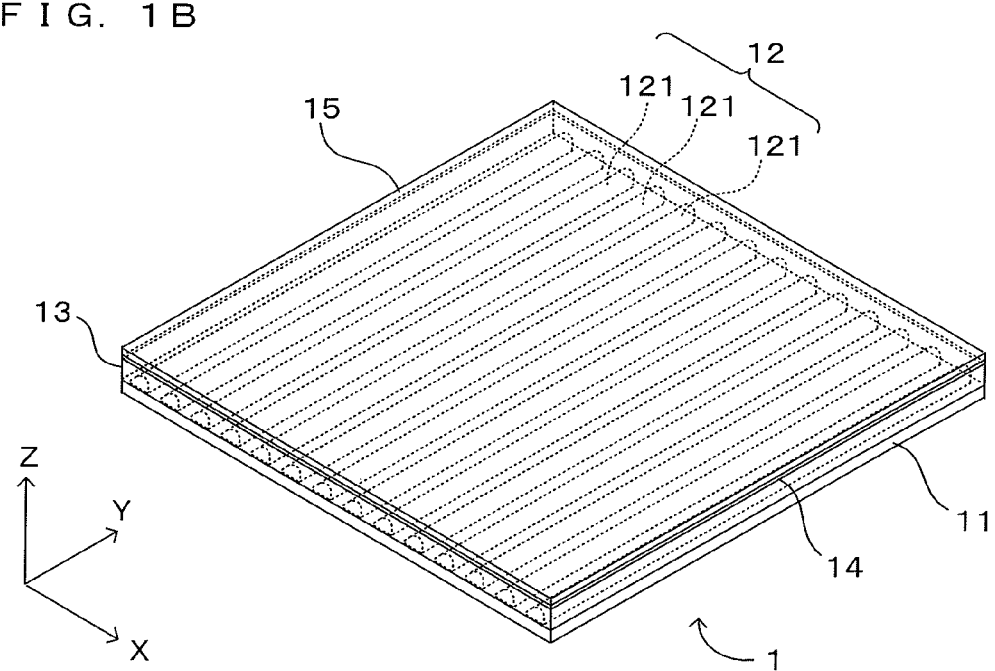
FIG. 1B is a perspective view of this battery.

FIG. 1A is a drawing which shows a cross-sectional structure of a lithium-ion secondary battery as one embodiment of a battery according to the invention. FIG. 1B is a perspective view of this battery. This lithium-ion secondary battery module 1 has such a structure that a negative-electrode active material layer 12, a solid electrolyte layer 13, a positive-electrode active material layer 14 and a positive-electrode current collector 15 are successively laminated on a surface of a negative-electrode current collector 11. In this specification, X-, Y- and Z-coordinate directions are respectively defined as shown in FIG. 1A.

As shown in FIG. 1B, the negative-electrode active material layer 12 has a line-and-space structure in which a multitude of stripe-shaped pattern elements 121 formed by a negative-electrode active material and extending in a Y-direction are arranged at regular intervals in an X-direction. On the other hand, the solid electrolyte layer 13 is formed by a solid electrolyte. The solid electrolyte layer 13 uniformly covers the substantially entire upper surface of a laminated body in such a manner as to conform to (follow) the unevenness on the surface of the laminated body in which the negative-electrode active material layer 12 is formed on the negative-electrode current collector 11 as described above. The lower surface of the solid electrolyte layer 13 has an uneven structure in conformity with the unevenness on the upper surface of the negative-electrode active material layer 12, whereas the upper surface thereof is a substantially flat surface.

The positive-electrode current collector 15 is laminated on the upper surface of the positive-electrode active material layer 14 formed to be substantially flat in this way, whereby the lithium-ion secondary battery module 1 is formed. A lithium-ion secondary battery is formed by appropriately arranging tab electrodes or laminating a plurality of modules on this lithium-ion secondary battery module 1.

Here, known materials for lithium-ion batteries can be used as materials for the respective layers. For example, a copper foil and an aluminum foil can be respectively used as the negative-electrode current collector 11 and the positive-electrode current collector 15. Further, a material mainly containing $LiCoO_2$ (LCO) can be, for example, used as a positive-electrode active material and a material mainly containing $Li_4Ti_5O_{12}$ (LTO) can be, for example, used as a negative-electrode active material. Furthermore, polyethylene oxide and polystyrene can be, for example, used as the solid electrolyte layer 13. Note that the materials for the respective functional layers are not limited to these.

The lithium-ion secondary battery module 1 having such a structure is thin and flexible. Since the negative-electrode active material layer 12 is formed to have an uneven space structure as shown and, thereby, increase its surface area with respect to its volume, an area facing the positive-electrode active material layer 14 via the thin solid electrolyte layer 13 can be increased to ensure high efficiency and high output. In this way, the lithium-ion secondary battery having the above structure can be small in size and have high performance.

Next, a method for manufacturing the above lithium-ion secondary battery module 1 is described. Conventionally, a module of this type has been formed by laminating thin film materials corresponding to respective functional layers, but there is a limit in increasing the density of the module by this manufacturing method. Further, with the manufacturing method disclosed in the literature described above, production takes time due to many operation steps and it is difficult to separate the respective functional layers. In contrast, with the manufacturing method described below, the lithium-ion secondary battery module 1 having the above structure can be produced with a smaller number of operation steps using an existing processing apparatus.

Figure 2:
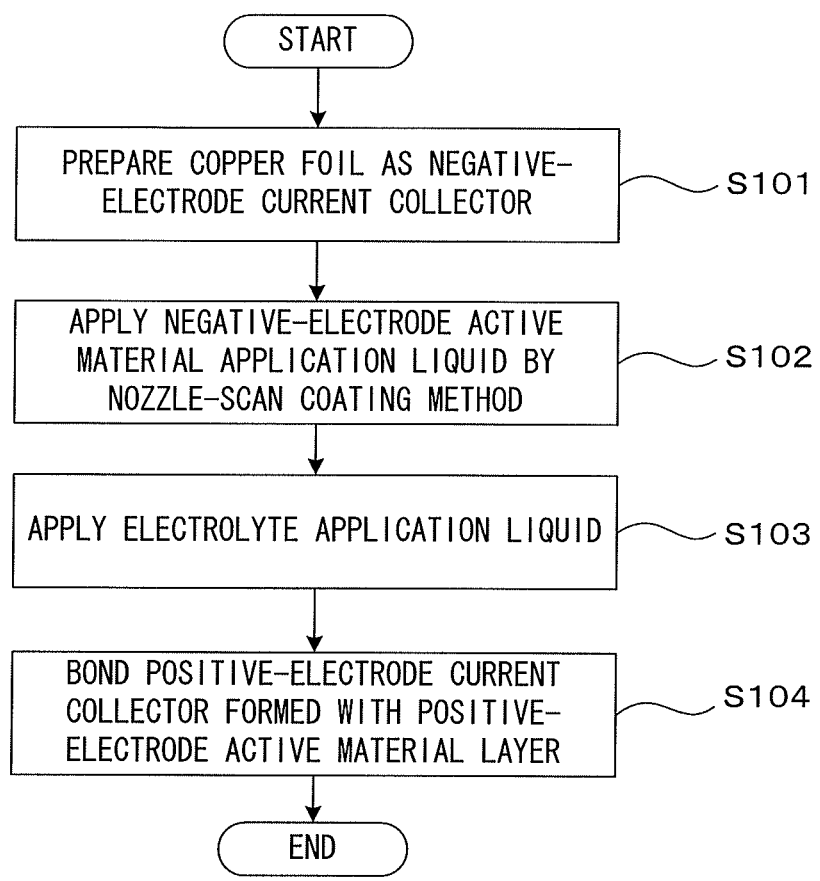
FIG. 2 is a flow chart which shows an example of a method for manufacturing the battery of FIG. 1A.

FIG. 2 is a flow chart which shows an example of a method for manufacturing the battery of FIG. 1A. In this manufacturing method, a metal foil, e.g. a copper foil, which will become the negative-electrode current collector 11, is first prepared (Step S101). In the case of using a thin copper foil, it is difficult to transport and handle this foil. Accordingly, it is preferable to improve transportability, for example, by attaching one surface of the copper foil to a carrier such as a glass plate or a resin sheet.

Subsequently, an application liquid containing a negative-electrode active material is applied to one surface of the copper foil by a nozzle dispensing method, in particular, by a nozzle-scan coating method for relatively moving a nozzle for dispensing the application liquid with respect to an application target surface (Step S102). An organic LTO material containing the negative-electrode active material described above can be, for example, used as the application liquid. A mixture of the above negative-electrode active material, acetylene black or ketjen black as a conduction aid, polyvinylidene fluoride (PVDF), styrene butadiene rubber (SBR), polyvinyl pyrrolidone (PVP), polyvinyl alcohol (PVA) or polytetrafluoroethylene (PTFE) as a binder, N-methyl-2-pyrrolidone (NMP) as a solvent and the like can be used as the application liquid. Note that, besides LTO described above, graphite, metal lithium, $SnO_2$, alloys and the like can be used as the negative-electrode active material.

Figure 3A:
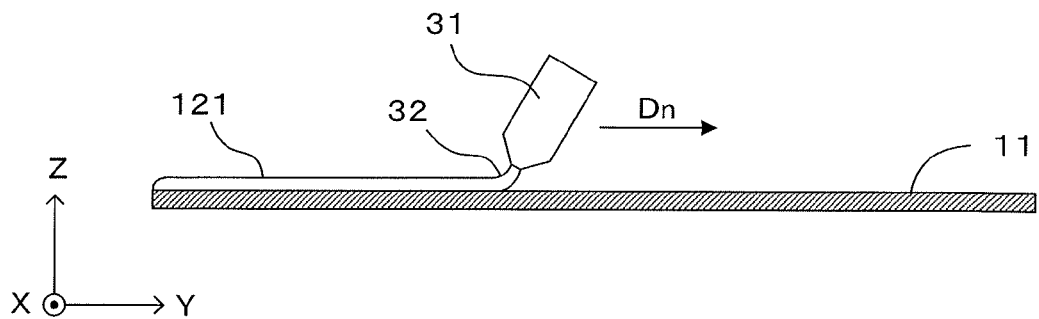
FIG. 3A is a drawing which shows a state of application by the nozzle-scan coating method when viewed in the X-direction.
Figure 3B:
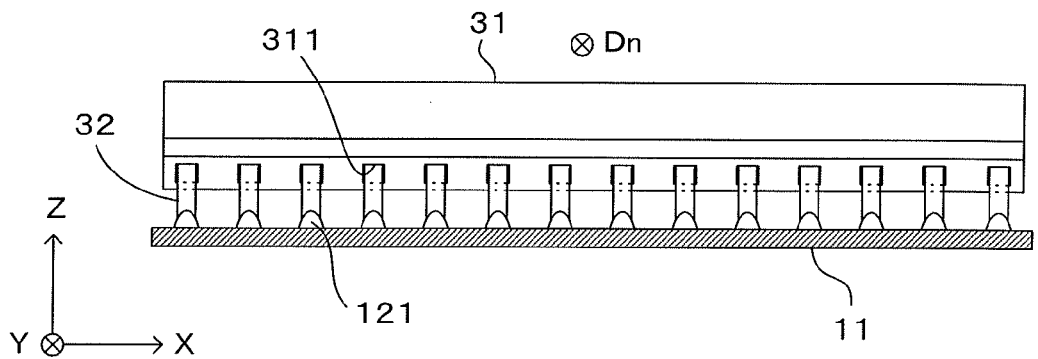
FIGS. 3B and 3C are drawings showing the same state when viewed in the Y-direction and from a diagonal upper side.
Figure 3C:
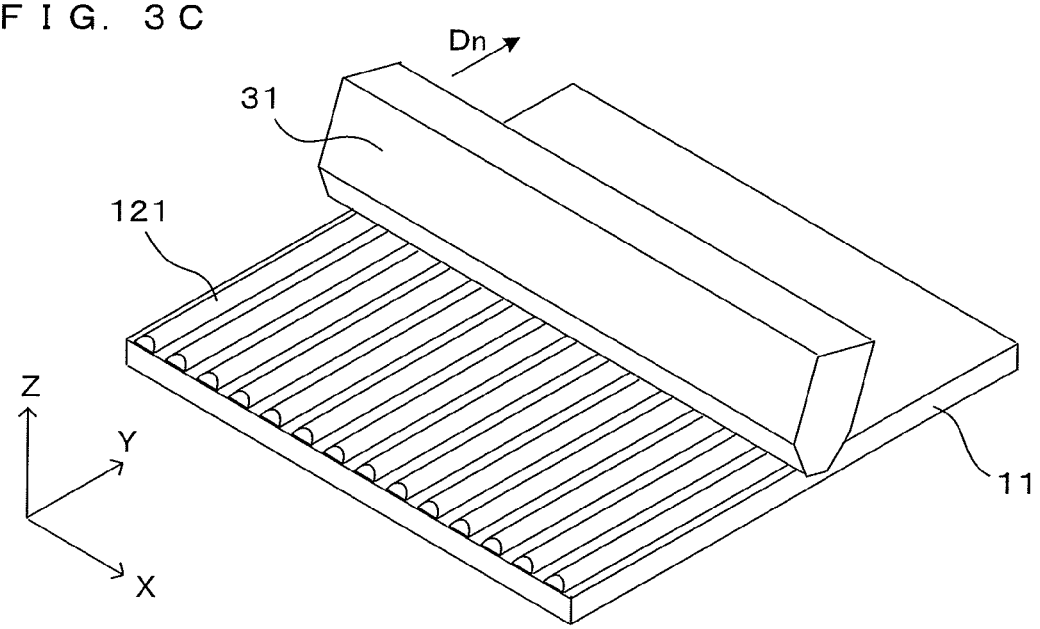

FIG. 3A is a drawing which shows a state of application by the nozzle-scan coating method when viewed in the X-direction, and FIGS. 3B and 3C are drawings showing the same state when viewed in the Y-direction and from a diagonal upper side. A technology for applying an application liquid to a base material by the nozzle-scan coating method is known and such a known technology can be applied also in this method, wherefore an apparatus construction is not described.

In the nozzle-scan coating method, a nozzle 31 perforated with one or more dispense openings 311 for dispensing the above organic LTO material as the application liquid is arranged above a copper foil 11. The nozzle 31 is relatively moved at a constant speed in an arrow direction Dn with respect to the copper foil 11 while dispensing a fixed amount of an application liquid 32 from the dispense opening(s) 311. By doing so, the application liquid 32 is applied on the copper foil 11 in a stripe extending in the Y-direction. By providing the nozzle 31 with a plurality of dispense openings 311, a plurality of stripes can be formed by one movement. By repeating this movement according to need, the application liquid can be applied in stripes on the entire surface of the copper foil 11. By drying and curing the application liquid, the stripe-shaped pattern elements 121 by the negative-electrode active material are formed on the upper surface of the copper foil 11. Heating may be applied after application to promote drying or a photo-curable resin may be added to the application liquid and the application liquid may be cured by light irradiation after application.

At this point of time, an active material layer 12 is partly raised on the substantially flat surface of the copper foil 11. Thus, as compared with the case where the application liquid is simply applied to have a flat upper surface, a surface area can be increased with respect to the used amount of the active material. Therefore, the area facing a positive-electrode active material layer to be formed later can be increased to ensure a high output.

The flow chart of FIG. 2 is further described. An electrolyte application liquid is applied on the upper surface of a laminated body, which is formed by laminating the negative-electrode active material layer 12 on the copper foil 11, by an appropriate coating method, e.g. a knife coating method or a bar coating method (Step S103). As the electrolyte application liquid, a mixture of a resin as the above polymer electrolyte material such as polyethylene oxide and polystyrene, a supporting salt such as $LiPF_6$ (lithium hexafluorophosphate) and a solvent such as diethylene carbonate can be used. The coating method is not limited above and known coating methods capable of forming a substantially flat surface can be appropriately employed as the coating method.

Subsequently, the positive-electrode active material layer 14 and an aluminum foil 15 as the positive-electrode current collector are laminated. An example of such laminating method is described. In advance, the positive-electrode active material layer 14 is formed on the aluminum foil 15 as the positive-electrode current collector by coating an application liquid containing an positive-electrode active material uniformly on the surface of the aluminum foil 15. The positive-electrode active material layer 14 is formed by applying a positive-electrode active material application liquid containing a positive-electrode active material by an appropriate coating method, e.g. a known knife coating method. An aqueous LCO material obtained by mixing the positive-electrode active material, acetylene black as a conduction aid, SBR as a binder, carboxymethylcellulose (CMC) as a dispersant and pure water as a solvent can be, for example, used as the application liquid containing the positive-electrode active material. Besides the above LCO, $LiNiO_2$, $LiFePO_4$, $LiMnPO_4$, $LiMn_2O_4$ or compounds represented by $LiMeO_2$ (Me=$M_xM_yM_z$; Me, M are transition metal elements and x+y+z=1) such as $LiNi_{1/3}Mn_{1/3}Co_{1/3}O_2$ and $LiNi_{0.8}Co_{0.15}Al_{0.05}O_2$ can be used as the positive-electrode active material. Known coating methods capable of forming a flat film on a flat surface such as a knife coating method, a bar coating method and a spin coating method can be appropriately employed as the coating method.

Before the electrolyte application liquid applied in Step S103 is cured, the aluminum foil 15 formed with the positive-electrode active material layer 14 is bonded to tightly attach the positive-electrode active material layer 14 and the electrolyte application liquid (Step S104). At this time, to further increase adhesion, the electrolyte application liquid may be also applied on the positive-electrode active material layer 14 on the surface of the aluminum foil 15.

By doing so, the lithium-ion secondary battery module 1 in which the negative-electrode current collector 11, the negative-electrode active material layer 12, the solid electrolyte layer 13, the positive-electrode active material layer 14 and the positive-electrode current collector 15 are successively laminated is formed. Besides the above method, for example, an application liquid containing a negative-electrode active material may be applied and the positive-electrode current collector 15 may be bonded after the solid electrolyte layer 13 is formed by applying the electrolyte application liquid and curing it.

Figure 4:
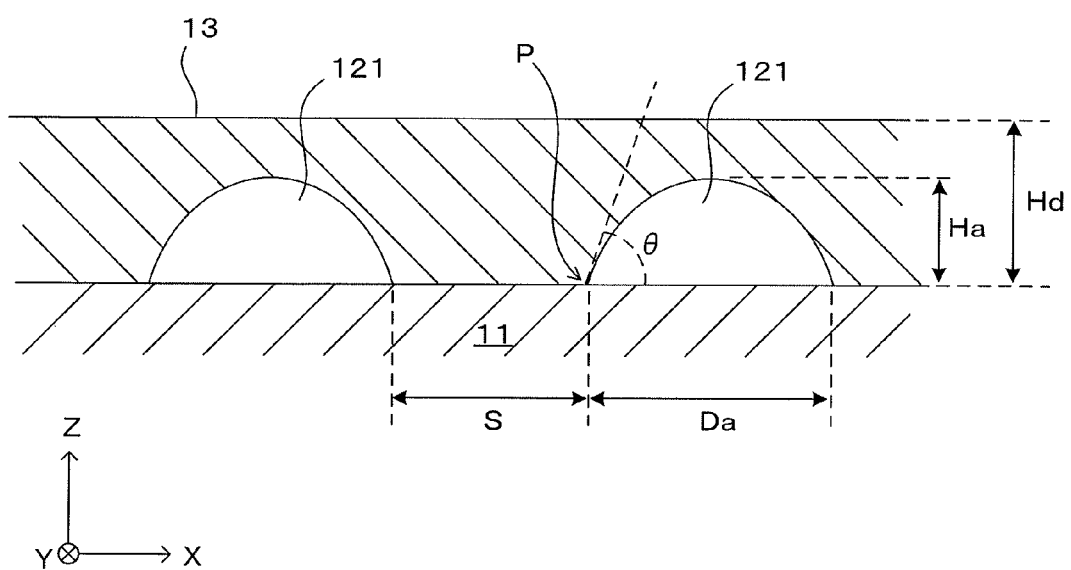
FIG. 4 is an enlarged sectional view which shows a cross-sectional shape of the negative-electrode active material layer.

Next, the structure of the negative-electrode active material layer in the lithium-ion secondary battery module 1 is described in more detail with reference to FIGS. 4 to 7C. FIG. 4 is an enlarged sectional view which shows a cross-sectional shape of the negative-electrode active material layer. FIGS. 5A, 5B, 6A and 6B are graphs which show actual measurement data on properties of the battery of this embodiment. FIGS. 7A, 7B and 7C are drawings which diagrammatically show a difference between the structure of the battery according to the invention and that of a conventional battery module.

As shown in FIG. 1B, the negative-electrode active material layer 12 in this embodiment has an island structure in which a plurality of stripe-shaped pattern elements 121 extending in the Y direction are separated from each other in the X-direction. FIG. 4 shows a cross section of the stripe-shaped pattern elements 121 cut along an X-Z plane. As shown in FIG. 4, the surfaces of the stripe-shaped pattern elements 121 are smooth curved surfaces convex upward (Z direction).

Typical dimensions of respective parts in the battery module 1 prototyped by the inventors of this application are: a width Da of the stripe-shaped pattern elements 121 is about 170 μm and a height Ha thereof is about 100 μm. A distance S between the adjacent stripe-shaped pattern elements 121, 121 is about 160 μm. A thickness Hd of the solid electrolyte layer 13 is about 200 μm.

A "contact angle" denoted by θ in FIG. 4 at a "contact point" P where the negative-electrode current collector 11, the stripe-shaped pattern element 121 made of the negative-electrode active material and the solid electrolyte layer 13 are in contact is smaller than 90°. In this specification, the contact point P means a position where the stripe-shaped pattern element 121 stands up from the negative-electrode current collector 11. Further, the contact angle θ means a gradient of the surface of the stripe-shaped pattern element 121 at the contact point P, i.e. an angle at a side including the stripe-shaped pattern element 121 out of angles formed between a tangent drawn to the stripe-shaped pattern element 121 at the contact point P and the negative-electrode current collector 11.

As a result of various experiments, the inventors of this application found that the battery could have good characteristics if the negative-electrode active material layer 12 was formed by the stripe-shaped pattern elements 121 formed such that this contact angle θ was smaller than 90° (about 60° in this example). Specifically, the inventors of this application succeeded in manufacturing a battery, which had both good charge and discharge characteristics and a high capacity at normal temperature (30° C.), for the first time. Any of actual measurement results disclosed below was obtained from the measurement at ambient temperature (30° C.).

FIGS. 5A and 5B show cyclic voltammograms actually measured in the prototyped battery module 1. More specifically, FIG. 5A shows actual measurement results (CV curves) in the battery module 1 of this embodiment having the above dimensions. FIG. 5B shows actual measurement results in a comparative example separately prepared. This comparative example does not have a line-and-space structure as in this embodiment and includes a negative-electrode active material film with a substantially uniform thickness formed on a surface of a negative-electrode current collector layer, wherein a film thickness thereof is about 43 μm.

Obtained current densities were substantially the same in this embodiment and the comparative example. However, the used amount of a negative-electrode active material (LTO) is 10.26 mg/cm$^2$ in the comparative example while being 4.08 mg/cm$^2$, i.e. about 40%, in this embodiment employing the line-and-space structure. Accordingly, in terms of use efficiency of the negative-electrode active material, this embodiment can be said to be about 2.5 times higher than the comparative example. This means that the used amount of an active material necessary to obtain the same theoretical current density can be much less in batteries having the structure of this embodiment. No meaningful difference was seen in measurements repeated a plurality of times (three measurement results are respectively denoted by "1st", "2nd" and "3rd" in FIGS. 5A and 5B).

FIGS. 6A and 6B show charge and discharge characteristics. FIG. 6A shows actual measurement results in this embodiment and FIG. 6B shows actual measurement results in the same comparative example as above. In both results, a voltage peak is seen in about 2.35 V, which is a reasonable value in the light of a combination of used active materials (LTO and LCO). Further, a charge and discharge capacity per gram of the used active materials was about 25 to 40 mAh at a 0.1C rate in the comparative example shown in FIG. 6B, whereas it was as high as about 60 to 80 mAh even at a 0.3C rate, which is a more severe rate, in this embodiment shown in FIG. 6A.

As described above, it was confirmed that the lithium-ion secondary battery module 1 of this embodiment had both a high capacity and good charge and discharge characteristics.

According to the knowledge of the inventors of this application, preferred ranges of the dimensions of the respective parts that provide good battery properties are generally as follows. Specifically, it is preferable that the width Da of the stripe-shaped pattern elements 121 is 20 μm to 300 μm, the height Ha thereof is about 10 μm to 300 μm and an aspect ratio of cross sections thereof, i.e. a ratio of the height Ha to the width Da is equal to or larger than 0.5.

The inventors of this application thought as follows for the reason why the battery of this embodiment displayed good properties. A case is considered where, as shown in FIG. 7A, an external direct-current power supply Vc is connected to the lithium-ion secondary battery module 1 of this embodiment and a higher potential is given to the positive-electrode current collector 15 than to the negative-electrode current collector 11. This state is equivalent to a case where the lithium-ion secondary battery module 1 is charged by the external direct-current power supply Vc. At this time, lithium atoms in the positive-electrode active material layer 14 emit electrons (indicated by "e$^-$" in FIG. 7A) to become lithium ions (indicated by "Li$^+$" in FIG. 7A), which migrate in the solid electrolyte layer 13 and reach the negative-electrode active material layer 12 (stripe-shaped pattern elements 121). Then, these lithium ions are recombined with electrons supplied to the negative-electrode active material layer 12 via the negative-electrode current collector 11. By storing lithium atoms in the negative-electrode active material layer 12, the lithium-ion secondary battery module 1 is charged when viewed from the outside of the module.

In this embodiment, the contact angle θ at the contact point P is smaller than 90°. Thus, the thickness of the stripe-shaped pattern element 121 is very small at the contact point P. Particularly in this embodiment, the thickness is zero at the contact point P since the negative-electrode current collector 11 and the solid electrolyte layer 13 are in contact and increases with distance from the contact point P. Accordingly, the negative-electrode current collector 11 and the solid electrolyte layer 13 face each other with the very thin negative-electrode active material layer 12 therebetween near the contact points P. Thus, moving distances of lithium ions and electrons for recombination in the negative-electrode active material layer 12 can be very short. The same holds for a discharge in which lithium ions in the negative-electrode active material layer 12 conversely emit electrons. This is thought to contribute to an improvement in charge and discharge characteristics. On the other hand, since the negative-electrode active material layer 12 has a sufficient thickness in areas distant from the contact points P, many lithium atoms can be stored and a high capacity can be ensured. In this way, it is possible to combine good charge and discharge characteristics and a high capacity in the lithium-ion secondary battery module 1 of this embodiment.

It is thought to be possible to obtain good charge and discharge characteristics also in the prior art battery described above by forming the negative-electrode active material layer very thin, for example, as shown in FIG. 7B. However, with such a construction, the amount of storable lithium atoms is limited and it is difficult to ensure a high capacity since the amount (volume) of the used negative-electrode active material is small. If the negative-electrode active material layer is thickened as shown in FIG. 7C, the capacity can be increased. However, if the contact angle θ is 90° or larger, moving distances of ions and electrons in the negative-electrode active material layer are longer, wherefore charge and discharge characteristics are poor.

As described above, in this embodiment, the negative-electrode active material layer 12 has an island structure by being made up of a plurality of stripe-shaped pattern elements 121 in the lithium-ion secondary battery module 1 in which the negative-electrode current collector 11, the negative-electrode active material layer 12, the solid electrolyte layer 13, the positive-electrode active material layer 14 and the positive-electrode current collector 15 are successively laminated. The contact angle θ of the stripe-shaped pattern elements 12 with respect to the negative-electrode current collector 11 is set smaller than 90°. By such a structure, it becomes possible to construct a battery which operates at normal temperature and has a high capacity and good charge and discharge characteristics.

Here, the stripe-shaped pattern elements 121 constituting the negative-electrode active material layer 12 are formed by relatively moving the nozzle 31 for discharging the application liquid containing the negative-electrode active material with respect to the surface of the base material (negative-electrode current collector 11) in the Y-direction. By patterning by such a so-called nozzle-scan coating method, a multitude of stripe-shaped pattern elements parallel to each other can be formed in a short time with good controllability and minute patterns can also be formed. Thus, a battery with good and stable electrical properties can be manufactured with excellent productivity and at low cost.

By forming the surfaces of the stripe-shaped pattern elements 121 into smooth curve surfaces free from sharp edges, a degree of contact between a negative-electrode structure including the negative-electrode current collector 11 and the negative-electrode active material layer 12 and the solid electrolyte layer 13 can be increased. This makes interfaces of these less susceptible to damages such as peeling caused by bending of the battery module and enables the construction of a battery with stable properties. Thus, a bendable battery can be constructed and easily housed in containers of various shapes. Application by the nozzle-scan coating method described above is a method particularly suitable to form the stripe-shaped pattern elements 121 having the above cross-sectional shape. Note that the structure of the negative-electrode active material layer 12 according to this embodiment is effective in improving properties not only for batteries including a solid electrolyte layer, but also for batteries including a liquid electrolyte layer composed of a separator and an electrolytic solution. In this case, it is not an essential requirement to form the surfaces of the stripe-shaped pattern elements 121 into smooth curved surfaces as described above.

The negative-electrode active material layer 12 in the above embodiment has the island structure in which a plurality of stripe-shaped pattern elements 121 extending in the Y direction are arranged in the X direction, and the respective stripe-shaped pattern elements 121 are formed on the surface of the negative-electrode current collector 11 independently of each other. However, the "island structure" mentioned in this specification is a concept indicating that main parts of the respective pattern elements are substantially independently present. Thus, the respective pattern elements may be not only completely independent of each other, but also partly connected as illustrated below.

Figure 8A:
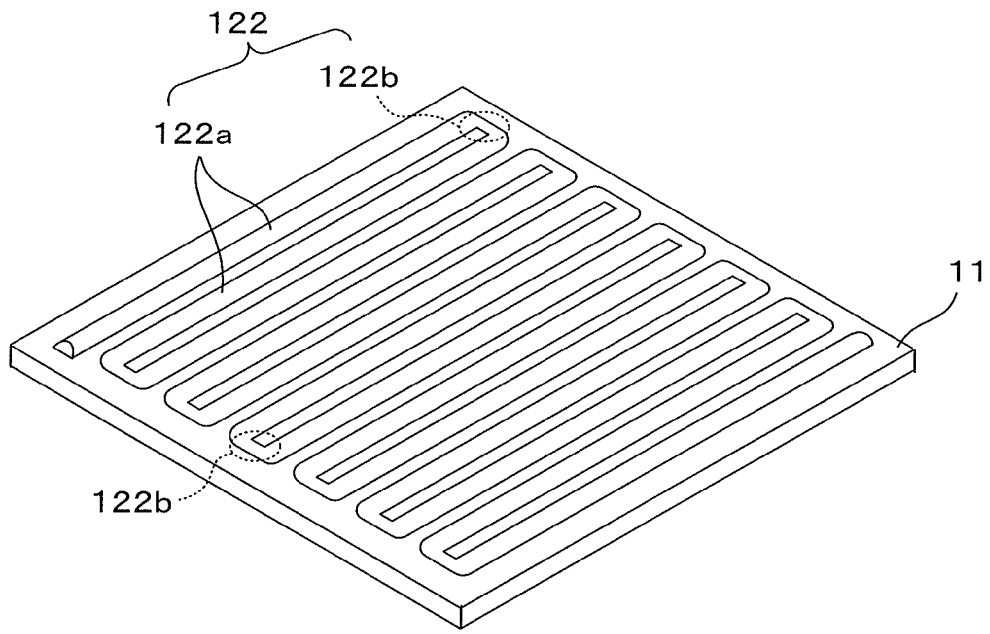
FIGS. 8A and 8B are drawings which show examples of other patterns of the negative-electrode active material layer.
Figure 8B:
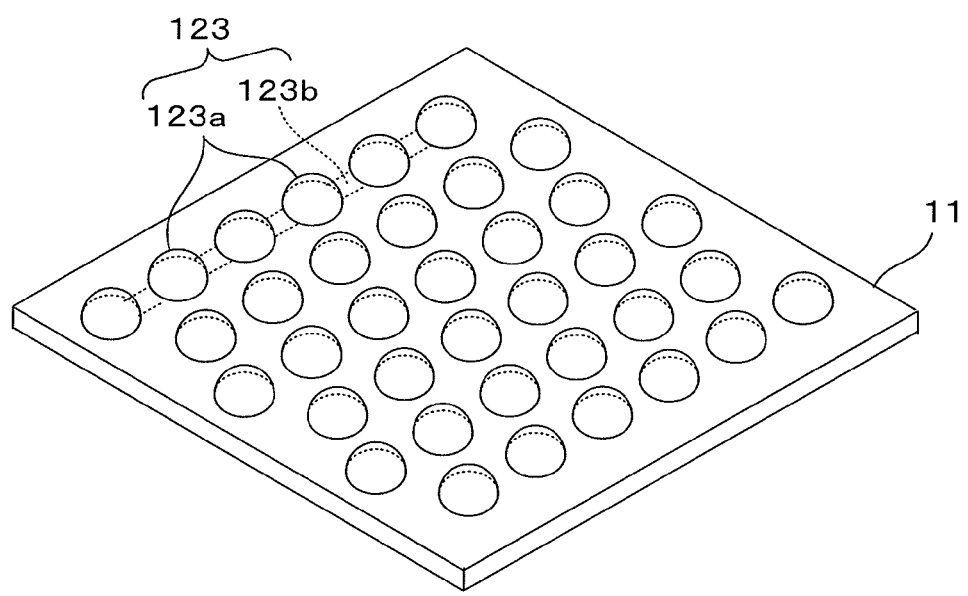

FIGS. 8A and 8B are drawings which show examples of other patterns of the negative-electrode active material layer. In a negative-electrode active material layer 122 illustrated in FIG. 8A, a plurality of stripe-shaped pattern elements 122*a* are formed on the surface of the negative-electrode current collector 11 as in the example of FIG. 1B. The adjacent stripe-shaped pattern elements 122*a* are connected to each other by connecting parts 122*b* made of the same material. Even in such a structure, the respective stripe-shaped pattern elements 122*a* have a function similar to the stripe-shaped pattern elements 121 in the example of FIG. 1B and can be said to substantially form an island structure.

In a negative-electrode active material layer 123 illustrated in FIG. 8B, a plurality of land-shaped pattern elements 123*a* having a substantially circular planar shape are formed in an arrangement on the surface of the negative-electrode current collector 11. The negative-electrode active material layer may have such a structure. Further, the plurality of land-shaped pattern elements 123*a* may be connected to each other via a connecting part 123*b* made of the same material. Such a shape can be formed by an application method adopting the nozzle-scan coating method as disclosed in JP2006-138911A of the patent application the applicant of this application previously filed.

Next, uses of the battery constructed as described above are described. Since the lithium-ion secondary battery module 1 of this embodiment has a high capacity and good charge and discharge characteristics at normal temperature, application to various devices is considered as illustrated below. Note that the following is an illustration of some of modes of various devices to which the battery of this embodiment is applicable, and the range of applications of the battery according to the invention is not limited to these.

FIG. 9 is a drawing which diagrammatically shows a vehicle, specifically an electric vehicle as an example of the device mounted with the battery according to the invention. This electric vehicle 70 includes wheels 71, a motor 72 for driving the wheels 71, and a battery 73 for supplying power to the motor 72. A multitude of lithium-ion secondary battery modules 1 connected in series and/or parallel to each other can be employed as this battery 73. Since the thus constructed battery 73 is small in size, has a high power supply capability and is rechargeable in a short time, it is suitable as a power supply for driving a vehicle such as the electric vehicle 70.

Figure 10:
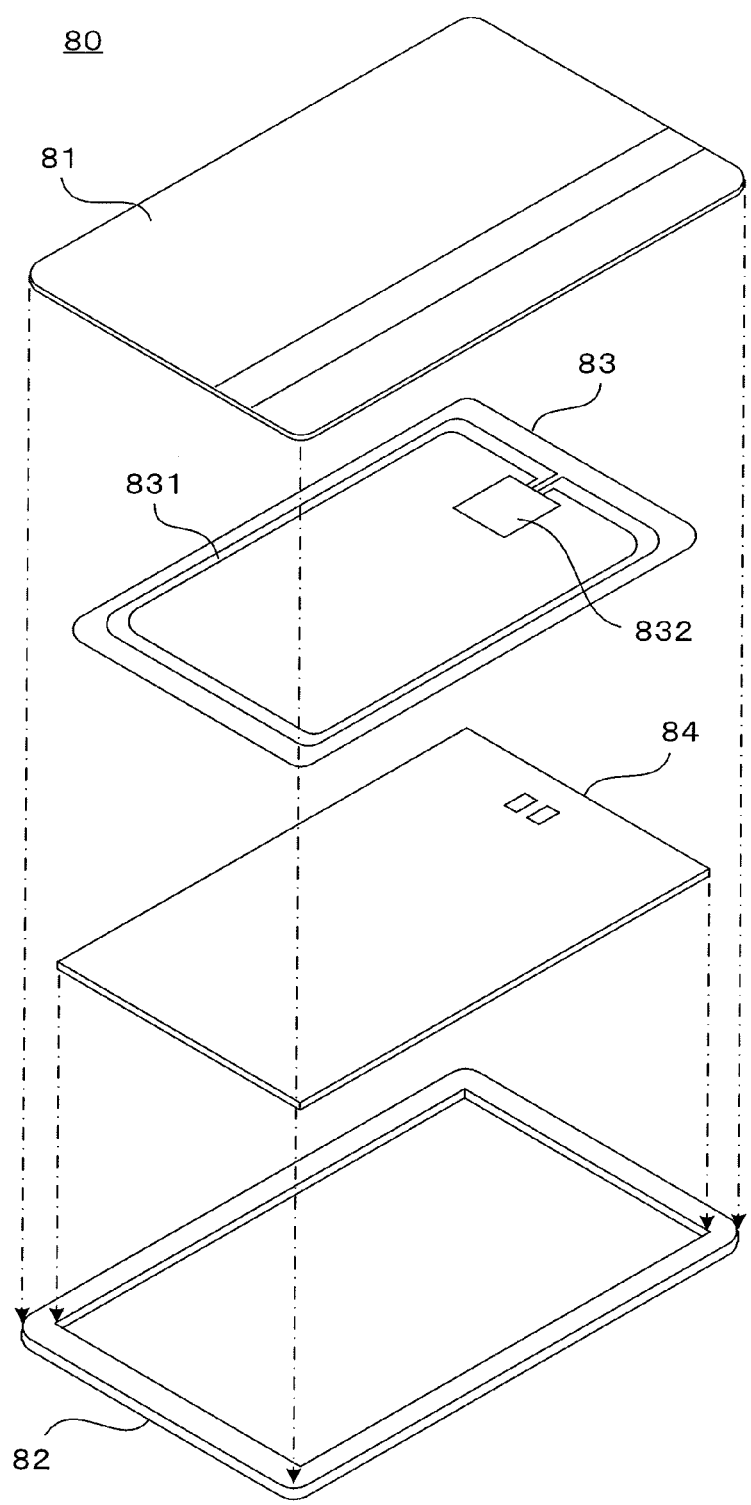
FIG. 10 is a drawing which diagrammatically shows an electronic device, specifically an IC card as another example of the device mounted with the battery according to the invention.

FIG. 10 is a drawing which diagrammatically shows an electronic device, specifically an IC card (smart card) as another example of the device mounted with the battery according to the invention. This IC card 80 includes a pair of housings 81, 82 which constitute a card type package by being fitted together, a circuit module 83 to be housed in these housings and a battery 84 which serves as a power supply for the circuit module 83. Out of these, the circuit module 83 includes a loop antenna 831 for external communication and a circuit block 832 with an integrated circuit (IC) for performing data exchange with external devices via the antenna 831 and various calculation and storage processes. One set or a plurality of sets of lithium-ion secondary battery modules 1 described above may be used as the battery 84.

According to this construction, a communication distance with external devices can be more extended as compared with general IC cards including no power supply themselves and more complicated processes can be performed. Since the battery 84 according to the invention is small in size and thin and can ensure a high capacity, it can be suitably applied to such card type devices.

Besides the above, the battery according to the invention is applicable to machines such as electrically assisted bicycles, electric tools and robots, mobile devices such as personal computers, mobiles phones, mobile music players, digital cameras and video camera, and various electronic devices such as game machines, portable measurement devices and communication devices, and toys.

As described above, in the above embodiment, the negative-electrode current collector 11, the negative-electrode active material layer 12, the solid electrolyte layer 13, the positive-electrode active material layer 14 and the positive-electrode current collector 15 respectively function as a "first current collector layer", a "first active material layer", an "electrolyte layer", a "second active material layer" and a "second current collector layer" of the invention. Further, the stripe-shaped pattern elements 121, 122*a* and the land-shaped pattern elements 123*a* constituting the negative-electrode active material layer correspond to "island parts" of the invention, and the connecting parts 122*b*, 123*b* to "connecting parts" of the invention.

Further, Steps S101 and S102 in the flow chart of FIG. 2 correspond to a "first step" of the invention, whereas Steps S103 and S104 correspond to a "second step" of the invention. The nozzle 31 in this embodiment functions as a "nozzle" of the invention.

Further, the electric vehicle 70 in the above embodiment corresponds to a "vehicle" of the invention. The IC card 80 in the above embodiment corresponds to an "electronic device" of the invention, and the housings 81, 82 thereof function as a "housing" of the invention and the circuit module 83 thereof functions as an "electronic circuit unit" of the invention.

The invention is not limited to the above embodiment and various changes other than those described above can be made without departing from the scope of the invention. For example, the negative-electrode active material layer 12 has the island structure in the embodiment but, instead or additionally, the positive-electrode active material layer may have an island structure.

In the above embodiment, the negative-electrode active material layer, the solid electrolyte layer, the positive-electrode active material layer and the positive-electrode current collector are successively laminated on the negative-electrode current collector. However, contrary to this, the positive-electrode active material layer, the solid electrolyte layer, the negative-electrode active material layer and the negative-electrode current collector may be laminated in this order on the positive-electrode current collector. Further, the forming method of the respective layers is not limited to the coating technique.

The above embodiment includes the solid electrolyte layer 13. However, the electrolyte layer is not limited to such a solid one. The invention is also applicable to more general batteries using an electrolytic solution.

The materials such as the current collectors, the active materials and the electrolyte illustrated in the above embodiment are merely examples and there is no limitation to these. Also in the case of manufacturing a lithium-ion battery using other materials used as constituent materials for lithium-ion batteries, the manufacturing method of the invention can be suitably employed. The invention is also applicable to production of batteries in general using other materials without being limited to lithium-ion batteries.

In the battery of the invention, the first current collector layer and the electrolyte layer may be in contact at contact points of the island parts and the first current collector layer. In such a construction, the first current collector layer and the electrolyte layer face each other with the very thin first active material layer near the contact points, wherefore charge and discharge characteristics are particularly good.

In the battery of the invention, the island parts may be formed to include stripe-shaped pattern elements extending along the surface of the first current collector layer. According to such a construction, the first active material layer can be formed to have large thickness and surface area and also a large area near the contact points with the first current collector layer. Such a pattern can be formed by applying an application liquid containing a first active material in stripes on the surface of the first current collector layer, wherefore manufacturing cost can be suppressed low.

In the battery of the invention, each island part may be formed such that a width of a portion in contact with the first current collector layer is 20 µm to 300 µm, a height is 10 µm to 300 µm and a ratio of the height to the width is equal to or larger than 0.5 in a cross-sectional shape of the island part along a section orthogonal to an extending direction of the stripe-shaped pattern elements. According to an experiment by the inventors of this application, battery performances were particularly good when the first active material layer was formed to have these dimensions.

In the battery of the invention, the electrolyte layer may include a solid electrolyte and the surfaces of the respective island parts except the portions in contact with the first current collector layer may be smooth curved surfaces. A battery including an electrolyte layer containing a solid electrolyte is easily handled since no electrolytic solution mainly containing an organic solvent is used. If the surfaces of the island parts of the first active material layer are smooth curved surfaces in this case, contact between the solid electrolyte layer and the first active material layer can be increased and battery performances can be stable.

In the first step of the battery manufacturing method according to the invention, the first active material layer may be formed by applying an application liquid that contains an active material discharged from a nozzle to the surface of the base material. Further studies have been and are being made on such an application technology utilizing a so-called nozzle dispensing method and the first active material layer having the island structure described above can be formed with good controllability by appropriately adjusting the composition of the application liquid. Further, the application liquid may be applied in stripes on the surface of the base material by relatively moving the nozzle in a predetermined direction with respect to the surface of the base material. According to such a process, it is possible to form a pattern with stable line widths and height and stably manufacture a battery with good performances.

Since the battery according to this invention has both a high capacity and good charge and discharge characteristics despite its small and thin size and also has excellent productivity, it can be suitably applied to battery-mounted vehicles and various electronic devices.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A battery comprising a first current collector layer, a first active material layer, an electrolyte layer, a second active material layer and a second current collector layer laminated in this order, wherein, the first active material layer has a line-and-space structure in which a plurality of stripe-shaped pattern elements containing an active material, extending in an extending direction along a surface of the first current collector layer and being parallel to each other are arranged on the surface of the first current collector layer; wherein the first current collector layer and the electrolyte layer are in contact with each other at the contact points of the stripe-shaped pattern elements and the first current collector layer; and an angle formed between the surface of the first current collector layer and a tangent drawn to the first active material layer at a contact point of each stripe-shaped pattern element and the first current collector layer is smaller than 90°.

2. The battery according to claim 1, wherein the stripe-shaped pattern elements extend continuously along the surface of the first current collector layer.

3. The battery according to claim 1, wherein a cross-sectional shape of each stripe-shaped pattern element along a section orthogonal to the extending direction is such that a width of a portion in contact with the first current collector layer is 20 µm to 300 µm, a maximum height taken orthogonal to the first current collector layer is 10 µm to 300 µm and a ratio of the height to the width is equal to or larger than 0.5.

4. The battery according to claim 1, wherein:
the electrolyte layer contains a solid electrolyte material; and
surfaces of the stripe-shaped pattern elements except the portions in contact with the first current collector layer are smooth curved surfaces.

5. The battery according to claim 1, wherein the first active material layer includes connecting parts connecting the plurality of stripe-shaped pattern elements to each other.

6. A vehicle, comprising:
   a motor; and
   the battery according to claim 1 arranged for supplying power to the motor.

7. An electronic device, comprising:
   the battery according to claim 1; and
   a circuit unit which operates using the battery as a power supply.

8. The electronic device according to claim 7, further comprising a card type housing for holding the battery and the circuit unit.

9. A battery manufacturing method, the battery comprising:
   a first current collector layer, a first active material layer, an electrolyte layer, a second active material layer and a second current collector layer laminated in this order, wherein,
   the first active material layer has a line-and-space structure including a plurality of stripe-shaped pattern elements containing an active material extending in an extending direction along a surface of the first current collector layer and being parallel to each other;
   wherein the first current collector layer and the electrolyte layer are in contact with each other at the contact points of the stripe-shaped pattern elements and the first current collector layer; and
   an angle formed between the surface of the first current collector layer and a tangent drawn to the first active material layer at a contact point of each stripe-shaped pattern element and the first current collector layer is smaller than 90°; the method comprising:
   a first step of forming a first active material layer, which has a line-and-space structure composed of a plurality of stripe-shaped pattern elements extending in an extending direction along a surface of a base material which will become a first current collector layer; and
   a second step of laminating an electrolyte layer covering exposed surfaces of the base material not covered by the first active material layer and a surface of the first active material layer, a second active material layer and a second current collector layer;
   wherein, in the first step, an angle formed between the surface of the first current collector layer and a tangent drawn to the first active material layer at a contact point of each stripe-shaped pattern element and the first current collector layer is smaller than 90°,
   wherein, in the first step, the first active material layer is formed by applying an application liquid that contains an active material, discharged from a nozzle by a plurality of dispense openings thereof to the surface of the base material so as to form said plurality of stripe-shaped elements; and
   the application liquid is applied in stripes on the surface of the base material by relatively moving the nozzle in a predetermined direction with respect to the surface of the base material so that the first active material layer has the line-and-space structure in which the plurality of the stripe-shaped pattern elements are parallel to each other.

10. The battery manufacturing method according to claim 9, wherein, in the first step, the application liquid is continuously discharged from the dispense openings of the nozzle to the surface of the base material so as to form said plurality of stripe-shaped pattern elements.

11. A battery, comprising a first current collector layer, a first active material layer, a electrolyte layer, a second active material layer and a second current collector layer, wherein,
   the first current collector layer, the first active material layer, the electrolyte layer, the second active material layer and the second current collector layer are laminated in this order and manufactured by the manufacturing method according to claim 9.

12. The battery according to claim 3, wherein said width is about 170 μm and said maximum height is about 100 μm.

13. The battery according to claim 12, wherein said angle is about 60°.

14. The battery according to claim 1, wherein said angle is about 60°.

15. The battery according to claim 1, wherein a length of the stripe-shaped pattern elements in the extending direction is larger than both a width of a portion in contact with the first current collector layer and a height of the stripe-shaped pattern elements.

16. The battery according to claim 1, wherein in the first active material layer, one stripe-shaped pattern element which extends longitudinally and continuously in the extending direction is disposed in the extending direction, and plural stripe-shaped pattern elements are arranged in orthogonal direction to the extending direction.

17. The battery according to claim 16, wherein each stripe-shaped pattern element extends continuously from one end to another end of the first current collector layer in the extending direction.

18. The battery according to claim 16, wherein a width of a portion in contact with the first current collector layer is constant in the extending direction.

* * * * *